United States Patent [19]

Smith et al.

[11] 4,223,843
[45] Sep. 23, 1980

[54] AIR DISTRIBUTION APPARATUS

[75] Inventors: Randlow Smith, Houston; John P. MacLean, Stafford; Dale Williams, Houston; Rich W. Barkley, Houston; Henry B. Jones, Houston, all of Tex.

[73] Assignee: Texaco Inc., White Plains, N.Y.

[21] Appl. No.: 887,289

[22] Filed: Mar. 16, 1978

Related U.S. Application Data

[63] Continuation-in-part of Ser. No. 768,010, Feb. 11, 1977, abandoned.

[51] Int. Cl.$^2$ .............................. B01J 8/08; B01J 21/20
[52] U.S. Cl. ................................... 239/558; 34/57 A; 239/567; 239/600; 285/286; 422/144
[58] Field of Search ....... 34/57 A; 422/139, 143–145, 422/177, 189; 285/189, 286, 422; 228/135, 175, 176; 239/548, 550, 554, 558, 559, 560, 561, 567, 568, 589, 600–602; 208/150

[56] References Cited

U.S. PATENT DOCUMENTS

| | | | |
|---|---|---|---|
| 2,798,030 | 7/1957 | Hettick et al. | 34/57 A X |
| 2,898,290 | 8/1959 | Swabb, Jr. | 422/144 X |
| 3,119,632 | 1/1964 | Skinner | 285/286 X |
| 3,163,449 | 12/1964 | Westfall | 285/286 X |
| 3,433,733 | 3/1969 | Bunn, Jr. et al. | 208/150 |
| 3,466,021 | 9/1969 | Van Weert et al. | 422/139 X |
| 3,632,304 | 1/1972 | Hardison | 422/177 X |
| 3,848,811 | 11/1974 | Fryback | 239/560 X |
| 3,867,103 | 2/1975 | Boney et al. | 422/189 |
| 3,912,460 | 10/1975 | McGann | 239/559 X |
| 3,974,091 | 8/1976 | Parker et al. | 422/144 X |
| 4,035,153 | 7/1977 | Bunn, Jr. et al. | 422/144 |

*Primary Examiner*—Andres Kashnikow
*Attorney, Agent, or Firm*—Carl G. Ries; Thomas H. Whaley; Theron H. Nichols

[57] ABSTRACT

An air distribution apparatus for delivering an oxygen-carrying gas such as air to a zone of spent catalyst in a regenerator for the purpose of combusting air with the spent catalyst in order to rejuvenate the catalyst. A header support assembly is adapted for mounting in a regenerator which receives the spent catalyst. A hollow header ring is mounted onto the header support assembly and includes a plurality of openings each having a nozzle mounted therein. Air is supplied to the header support assembly and thus to the hollow header ring at a pressure sufficiently high to effect a maximum desired pressure differential between header pressure and pressure in the zone of spent catalyst to cause maximum uniform air distribution. The nozzles mounted in the openings in the header ring decrease air velocity between nozzle inlet and nozzle outlet in order to provide for maximum uniform air distribution without destruction of the catalyst.

11 Claims, 3 Drawing Figures

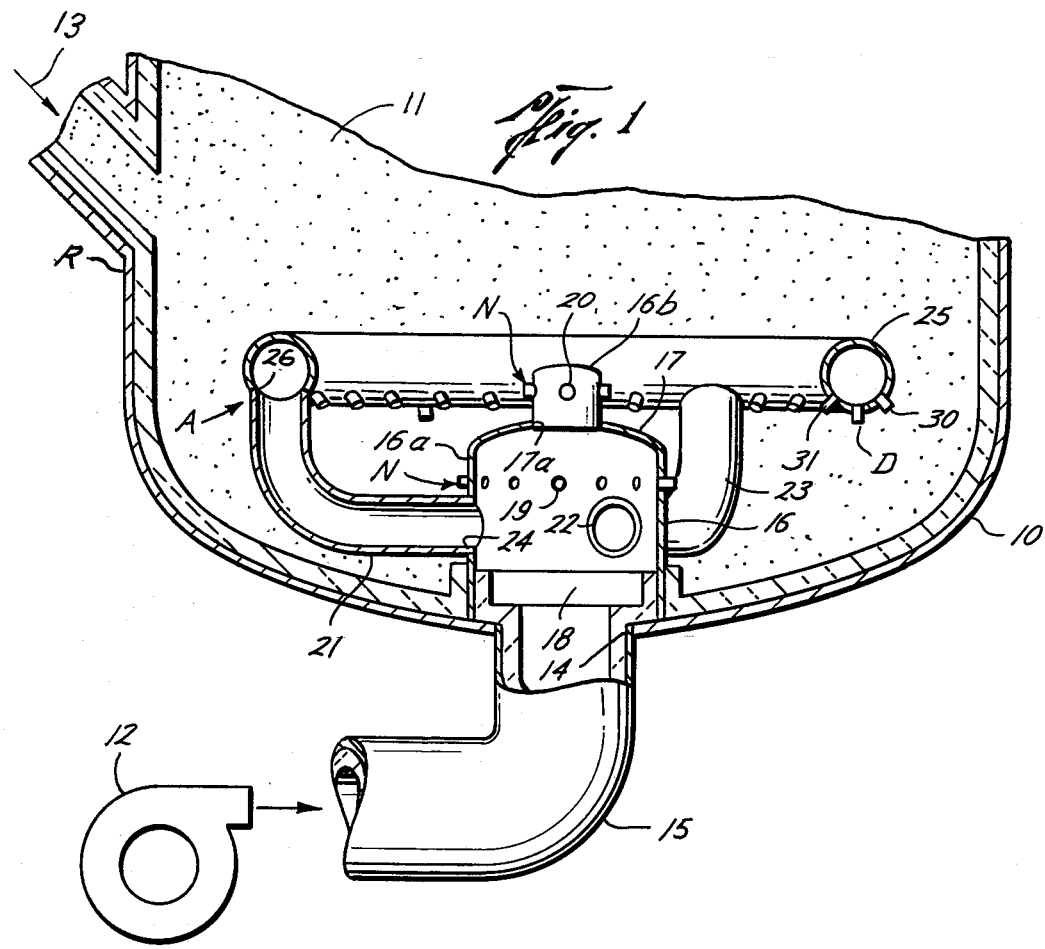
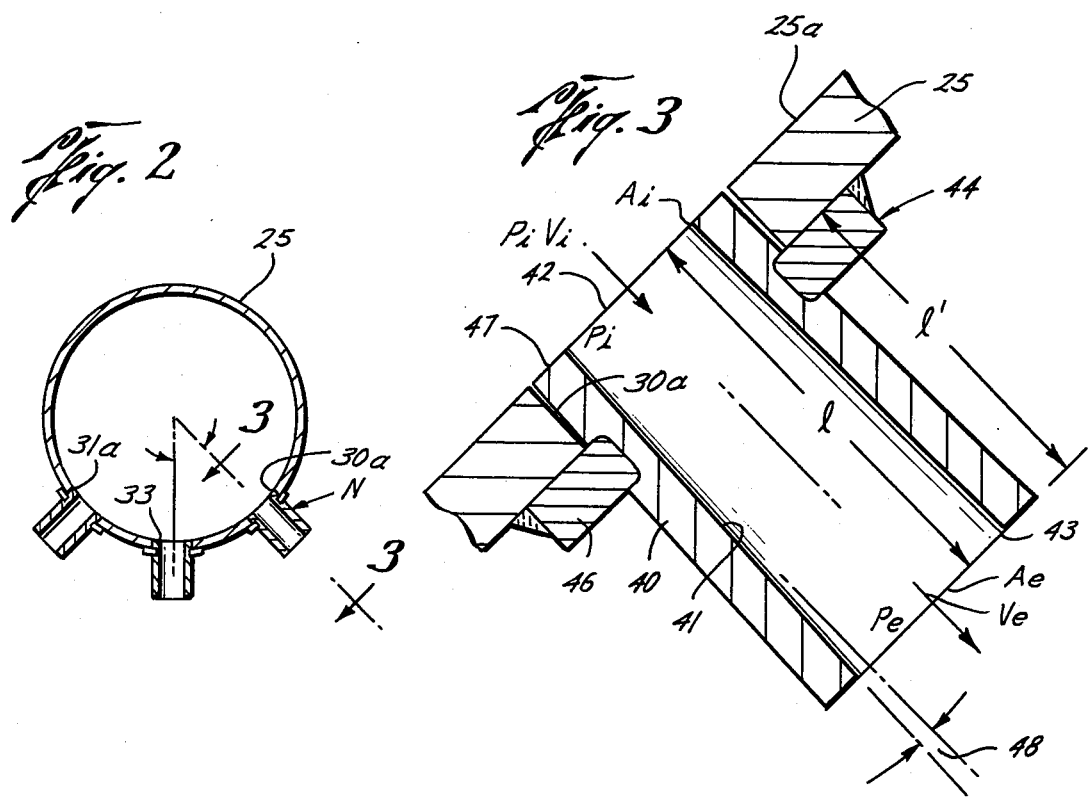

AIR DISTRIBUTION APPARATUS

CROSS REFERENCE TO RELATED APPLICATION

This is a Continuation-in-Part of application Ser. No. 768,010, filed Feb. 11, 1977 now abandoned.

BACKGROUND OF THE INVENTION

The field of this invention is air distribution and in particular air distribution in the catalyst regenerator of a fluid catalytic cracking unit.

U.S. Pat. No. 3,433,733 discloses a method and apparatus for fluid catalytic cracking of a hydrocarbon feedstock in order to produce desired reaction products. Generally, the process consists of mixing together feed stock and hot catalyst in a riser/reactor prior to entry into a tapered reactor/separator chamber. The catalyst is removed from the reactor/separator chamber in a spent condition and is directed to a regenerator wherein the carbonaceous deposit on the catalyst, referred to as "coke", is burned from the catalyst with air. The regenerated catalyst is then re-used in the process. In U.S. Pat. No. 3,433,733, an air distributor is positioned in the lower portion of the regenerator for distributing an air supply into a zone of spent catalyst in the regenerator. The efficiency of the regeneration process is dependent upon a uniform distribution of air through the spent catalyst zone. It has been found desirable to distribute the air outwardly of the air distributor at certain pressure differentials between air pressure in the distributor and air pressure in the regenerator to cause the air to effectively bubble and thus distribute through the zone of spent catalyst. However, it has also been found that the velocity of the air leaving the air ring may be so high at such desired pressure differential levels that the air actually causes some attrition of the catalyst. In order to prevent this attrition, it has been necessary to deliver the air at pressures below the higher pressure differential levels for the most efficient distribution of the air through the spent catalyst zone in the regenerator.

U.S. Pat. No. 3,912,460 discloses an air distribution system for evenly distributing air in the spent catalyst zone of a regenerator in a fluid catalytic cracking process. A horizontal distributing ring is positioned in the spent catalyst in the regenerator. The ring comprises two tapered semi-circular tubes which are interconnected at their small ends; a splitter tube joint and the two larger ends of the tapered semi-cylindrical tubes are connected to a pressurized air supply. Air is distributed outwardly into the spent catalyst zone of the regenerator through openings in the semi-cylindrical tubes.

Other patents of interest include U.S. Pat. No. 3,867,103 which discloses the utilization of Venturi-shaped nozzles for use in mixing a hydrocarbon and acid to form an emulsion in a catalytic conversion apparatus. U.S. Pat. No. 3,848,811 discloses a particular structure for a nozzle which discharges a liquid such as oil into a fluidized bed of particulate material such as catalyst in a fluid catalytic cracking system. U.S. Pat. No. 3,632,304 discloses a heater nozzle which directs combustion gas into a reactor for providing a combustion gas stream for treating catalyst. U.S. Pat. No. 3,974,091 discloses a nozzle comprising two cylinders of different diameters connected with a beveled annulus resulting in a sudden expansion at a sharp taper angle which will not permit recovery of the pressure drop due to the gas expansion. Boundary layer separation and turbulence at the expansion will counteract the pressure drop recovery due to the expansion. While this patent has a similar objective, the instant disclosure shows a unique shape resulting in greater advantages. U.S. Pat. No. 4,035,153, assignee's own patent with a few of the same inventors, merely shows a similar header support. U.S. Pat. No. 2,798,030 discloses and desires entirely different nozzles. This patent teaches that half angles of taper should be "7° to 10°, preferably $7\frac{1}{2}$° to 9°, and still more preferably $8\frac{1}{2}$° providing a total angle of divergence or total included angle for the nozzle of 14°-20°, 15°-18°, and 17°, respectively." Instead, inventors have found the half angle of the taper may be defined at 48 as being up to but less than 7°, and preferably between 1° and 3.5° as shown in greater detail hereinafter.

The unobvious result of the newly disclosed nozzle is the higher pressure drop than that obtained in the past without increasing air blower horsepower or catalyst attrition. None of these patents disclose structure which is precisely capable of achieving the results of the invention set forth herein.

SUMMARY OF THE INVENTION

It is an object of this invention to provide a new and improved air distribution apparatus for delivering with maximum uniform air distribution an oxygen-carrying gas such as air into a zone of spent catalyst in a regenerator of a fluid catalytic cracking process.

It is a further object of this invention to deliver air into the spent catalyst zone of a fluid catalytic cracking process regenerator at a non-damaging velocity.

It is a further object of this invention to provide a plurality of air distribution nozzles mounted in an air distribution header located in a regenerator of a fluid catalytic cracking process for delivering air at pressure differential levels between the header and the regenerator that optimize air distribution and at the same time control the nozzle exit velocity to minimize attrition of the catalyst from air flow.

These objects, and other objects of this invention, are provided by the new and improved air distribution system of the preferred embodiment of this invention for delivering an oxygen-carrying gas such as air to a spent catalyst regenerator at a maximum desired pressure differential for effective air distribution but at a velocity which will minimize attrition of the catalyst. The air distribution system includes a header support assembly adapted for mounting in a regenerator and a hollow header ring having a plurality of openings therein. A plurality of nozzles are mounted in the header ring openings. Each of the nozzles has a bore therethrough which diverges outwardly from the point of air entry to the point of air exit to decrease the velocity of air from nozzle entry to nozzle exit.

These objects and other objects of this invention will be described in greater detail in the description of the preferred embodiment of this invention to follow. The objects as stated here are not exhaustive of the objects of this invention. The actual scope of the subject matter sought for protection will be defined and described in the claims.

BRIEF DESCRIPTION OF THE DRAWINGS

FIG. 1 is a side view in section of a regenerator of a fluid catalytic cracking process having the air distribution system of this invention positioned therein;

FIG. 2 is a sectional view of the air distribution system header ring which mounts the air distribution nozzles of the preferred embodiment of this invention; and FIG. 3 is a sectional view taken along line 3—3 of FIG. 2 illustrating the structural detail of the air distribution system nozzles.

DESCRIPTION OF THE INVENTION

This invention comprises a method for assembling or forming an air distribution apparatus and an air distribution apparatus formed or assembled by the above method or for being formed by other methods.

METHOD FOR ASSEMBLING AN AIR DISTRIBUTION APPARATUS

A method for assembling an air distribution apparatus for delivering an oxygen-carrying gas such as air to a zone of spent catalyst in a regenerator for the purpose of combusting air with the spent catalyst in order to rejuvenate the catalyst without damaging the catalyst comprising the steps of, (1) mounting a header ring means (25, FIG. 1) in the regenerator (R), (2) attaching high pressure air supply means (12) to the header ring means, (3) forming a plurality of nozzles (N) in the header ring means with each nozzle formed with a diverging bore (41, FIG. 3) for ejecting high pressure air from the header ring means into the spent catalyst, and (4) forming the diverging bore of each of the nozzles at a half angle of less than 7° for providing a maximum air velocity without destruction of the spent catalyst.

In greater detail, the last method step may comprise, (4) forming the diverging bore of each nozzle with a half angle between 1° and 3.5° for providing a maximum air velocity without damaging the spent catalyst.

DESCRIPTION OF THE PREFERRED EMBODIMENT

Referring to the drawing, the letter R, FIG. 1, generally designates a regenerator used in a fluid catalytic cracking process such as disclosed in U.S. Pat. No. 3,433,733. The regenerator R includes a new and improved air distribution apparatus, such as but not limited to one formed by the above method, generally designated by the letter A, adapted for mounting in the lower portion of the regenerator R. In a fluid catalytic cracking process such as disclosed in U.S. Pat. No. 3,433,733, the lower portion 10 of the regenerator R illustrated in FIG. 1 actually receives spent catalyst 13 from a reactor. The spent catalyst is in particulate form, the size of the particles being sufficiently small that the catalyst may be fluidized in air. The air distribution system A is designed to provide the necessary oxygen to combust with coke on the spent catalyst 13 to combust and burn the coke off the catalyst in order to rejuvenate the catalyst. The rejuvenated catalyst is then re-used in the fluid catalytic cracking process. The spent catalyst is collected in a zone or bed 11 in the lower portion 10 of the regenerator R. The purpose of the air distribution system A is to distribute bubbled air through the spent catalyst zone or bed 11 so that the coke covering the spent catalyst is combusted with the air and burned off the catalyst.

In the preferred embodiment of this invention, the air distribution system A, FIG. 1, includes a blower 12 which provides air under pressure to regenerator opening 14 through air supply line 15. A central housing 16 is mounted over the opening 14 in the regenerator R.

The housing 16, FIG. 1, includes a first housing section 16a and a second housing section 16b. The housing section 16a is basically a hollow, cylindrical structure which is mounted over the regenerator opening 14 by any suitable means such as welding. The housing section 16a includes a dome-shaped top section 17 having opening 17a therein.

The second housing section 16b, FIG. 1, is welded or otherwise mounted over the first housing section opening 17a. The second housing sections 16b is also a hollow and generally cylindrical section. The housing section 16b is enclosed at the top thereof.

The hollow housing sections 16a and 16b, FIG. 1, cooperate to form a plenum chamber 18 which receives air through the air supply line 15. The first housing section 16a has a circumferential row of openings 19 positioned in substantially horizontal alignment. Each of the openings 19 has mounted therein a nozzle N of the preferred embodiment of this invention as illustrated in detail in FIG. 3. The second housing section 16b, FIG. 1, also has a row of circumferentially spaced openings 20 therein which receive nozzles N of this invention.

Three radial support arms 21, 22, and 23, FIG. 1, are welded in three openings 24 in the first housing section 16a. Each of the radial support arms 21-23, are hollow pipe members having an approximate L-shape as viewed in FIG. 1.

The three radial support arms 21-23, FIG. 1, cooperate with the first and second housing sections 16a and 16b to provide a header support assembly for supporting a hollow, header ring 25.

The header ring 25, FIG. 1, includes three openings 26 which align with and receive the radial support arms 21-23, respectively, which are attached to the header ring 25 by welding or other suitable means. The header ring 25 further includes two rows 30 and 31 of nozzles N which are mounted in two rows of header ring openings 30a and 31a, FIG. 2, respectively. In addition, several drain nozzles D, FIG. 1, which are of the same configuration as the nozzles N to be described herein, are positioned in header ring openings 33, FIG. 2, which are located at the very bottom of the header ring 25 and are circumferentially spaced about the ring. The number of drain nozzles D, FIG. 1, is substantially fewer than the number of nozzles N in rows 30 and 31 in the header ring 25.

Complete distribution of air through the air distribution system A, FIG. 1, into the spent catalyst zone 11 in regenerator R is critical to efficient rejuvenation of the catalyst. The nozzles N of the preferred embodiment of this invention are designed to deliver air to the spent catalyst zone 11 in the regenerator R at a safe velocity level in order to provide for maximum dispersion of the air through the spent catalyst zone 11.

It has been found desirable to have a sufficiently high pressure differential between the pressure of the air in the header ring 25, FIG. 1, and the pressure of air exiting the nozzles N (which is the same as air pressure in the bed 11) to cause the air to uniformly disperse for high area contact with the spent catalyst particles. However, it has been found that air in prior art systems such as disclosed in U.S. Pat. No. 3,912,460 which exits a header ring at such sufficiently high pressure differential levels has a velocity that is so high that it may actually cause some attrition of the catalyst. The nozzles N of the preferred embodiment of this invention are designed to deliver air to the spent catalyst zone 11 at a velocity below a potentially damaging level.

Referring in particular to FIGS. 2 and 3, each of the nozzles N is formed of a frusto-conical, cylindrical section 40, FIG. 3, having a bore 41 therethrough. Each nozzle N diverges or flares in the bore 41 from nozzle inlet or entrance 42 to nozzle exit 43. Each nozzle N is an integral unit formed of cast Stellite or other suitable material.

Mount means generally designated by the number 44, FIG. 3, is provided for mounting each of the nozzles N in openings such as 30a in the header ring 25. The mount means 44 includes a mounting ring 46. When cast Stellite is utilized, the frusto-conical section 40 is formed by casting. However, cast Stellite is not capable of direct attachment to the header ring 25 through welding. In order to render the frusto-conical section 40 attachable to the header ring 25 by welding, the mounting ring 46 is attached to the frusto-conical section 40 during casting. The mounting ring 46 may then be welded to the header ring 25. If another suitable nozzle material is utilized which can be welded to the header ring 25, it is contemplated to form the mounting ring as an integral portion with the frusto-conical section for direct welding connection to the header ring 25. Nozzle entrance 42 is formed by an inside nozzle rim 47 which is positioned flush with interior wall 25a of the header ring 25.

The nozzle N, FIG. 3, may be defined as having a cross-sectional interior, circular area $A_i$ at nozzle entrance 42 and a cross-sectional interior, circular area $A_e$ at nozzle exit 43. The cross-sectional area $A_i$, and thus the interior diameter at the nozzle entrance 42, is less than the cross-sectional area $A_e$, and thus the interior diameter at the nozzle exit 43, such that the bore 41 tapers outwardly or diverges from the nozzle entrance 42 toward the nozzle exit 43. The half angle of such taper may be defined at 48 as being almost up to but less than 7°, but preferably between 1° and 3.5°. The length 1 of the nozzle, as well as the angle 48 of taper, will vary according to application.

By limiting the taper of the nozzle to less than a half angle of 7°, the instant invention avoids boundary layer separation in the nozzle. Thus, pressure losses in the taper of the nozzle are limited to frictional losses at the wall which are offset to some extent by pressure regain due to the decelerative effect of the increasing cross-sectional area as the nozzle diverges. If boundary layer separation did occur in the nozzles because of use of a high angle of taper (greater than 7° half angle), the resulting pressure loss could likely cause the need for a bigger air supply blower. Also, boundary layer separation could cause catalyst scouring of the nozzle walls resulting in wall erosion and catalyst attrition. The subject invention avoids the possibility of boundary layer separation by limiting nozzle taper to less than a half angle of 7°.

The air distribution system A provides air to the header ring 25, FIG. 3, in a pressure range to provide a sufficiently high pressure differential between the pressure in ring 25 (which is approximately the same at entrance pressure $P_i$) and the pressure in bed 11 (which is the same at nozzle exit pressure $P_e$) to provide for maximum uniform distribution of air into the bed 11. At such pressure levels, the tapered interior bore 41 of the nozzle section 40 acts to reduce the entrance velocity $V_i$ of air to a lesser exit velocity $V_e$ which will not cause significant damage to the catalyst. Thus utilizing the nozzles N of this invention, the air distribution system A can deliver air to the spent catalyst zone 11 at maximum pressure differential levels to cause maximum uniform dispersion of the air into the spent catalyst zone 11 but at a safe, reduced velocity level which will not cause substantial attrition of the spent catalyst.

EXAMPLE

In a fluid catalytic cracking unit such as described in U.S. Pat. No. 3,443,733, the nozzle N, FIG. 1, of this invention has a length 1' exterior to the header 25 of three inches. The area $A_i$ at the nozzle entrance 42, FIG. 3, is defined by a diameter of 1.55 inches (3.875 cm.) and the area $A_e$ at the exit is defined by a diameter of 1.65 inches (4.19 cm.). The air pressure in the ring 25 is at 40.0 psi (2.80 kg./sq. cm.) and the pressure drop from the ring 25 to the bed 11 is 1.5 (105.95 gr./sq. cm.) to 2.5 psi (175.76 gr./sq. cm.). The divergence of the bore 41 causes a reduction in velocity from an entrance velocity $V_i$ of 219 feet per second (66.75 m./sec.) to safe exit velocity $V_e$ of 175 feet per second (53.34 m./sec.).

The foregoing disclosure and description of the invention are illustrative and explanatory thereof, and various changes in the size, shape and materials as well as in the details of the illustrated construction may be made without departing from the spirit of the invention.

We claim:

1. A method for forming an air distribution apparatus for a regenerator for providing a maximum air velocity that will not damage spent catalyst therein comprising,
    (a) mounting a header ring means on a cylindrical housing means in the regenerator,
    (b) attaching high pressure air supply means to the cylindrical housing means for supplying the header ring means,
    (c) forming a plurality of nozzles in the header ring means, and in the cylindrical housing means with each nozzle formed with a diverging bore for ejecting high pressure air from the header ring means and cylindrical housing means into the spent catalyst, and
    (d) forming the diverging bore of each of the nozzles at a half angle of less than 7° for providing a maximum air velocity without destruction of the spent catalyst.

2. A method as recited in claim 1 wherein the last step comprises,
    (a) forming the diverging bore of each nozzle with a half angle between 1° and 3.5° for providing a maximum air velocity without damaging the spent catalyst.

3. A method as recited in claim 1 wherein the last step comprises,
    (a) forming the diverging bore of each nozzle with a half angle of 3.5°.

4. A method as recited in claim 1 wherein the first and third steps comprise,
    (a) mounting the header ring means on a first cylindrical housing means in the regenerator,
    (b) mounting a second cylindrical housing means on the first cylindrical housing means, and
    (c) forming a plurality of nozzles in the header ring means, in the first cylindrical housing means, and in the second cylindrical housing means.

5. An improved air distribution apparatus for delivering an oxygen-carrying gas such as air at high pressure to a zone of spent catalyst in a regenerator of a fluid catalytic cracking process with maximum desired pressure differential and at a velocity below a level which would damage the catalyst, comprising,
- (a) hollow cylindrical housing means for mounting in the regenerator,
- (b) hollow header means mounted on said hollow cylindrical housing means,
- (c) a plurality of nozzle means supported by said hollow cylindrical housing means and said hollow header means for receiving the high pressure air, and
- (d) each of said nozzle means having a bore divergence of a half angle of less than 7° for decreasing the delivered air velocity to a spent catalyst nondamaging velocity.

6. An air distribution apparatus as recited in claim 5 comprising,
- (a) said hollow cylindrical housing means comprising a first and a second cylindrical housing means, said second cylindrical housing means being mounted on said first cylindrical housing means, and
- (b) nozzle means for both said first and second cylindrical housing means.

7. An improved air distribution apparatus for delivering an oxygen-carrying gas such as air at high pressure to a zone of spent catalyst in a regenerator of a fluid catalytic cracking process with maximum desired pressure differential and at a velocity below a level which would damage the catalyst, comprising,
- (a) a header support assembly adapted for mounting in a regenerator of a fluid catalytic cracking process, said header support assembly supporting a hollow header ring having a plurality of openings therein,
- (b) said header support assembly comprising a first cylindrical housing means for supporting said hollow header ring,
- (c) an air supply line attached to said header support assembly and air supply means for supplying air through said air supply line to said hollow header ring at a pressure which causes a maximum effective pressure differential between said ring and in said regenerator,
- (d) a plurality of nozzles and mount means mounting said nozzles in said openings in said header ring, each of said nozzles having a bore therethrough which forms a nozzle inlet which initially receives air from said header ring and a nozzle exit for directing air outwardly into such spent catalyst zone, and
- (e) each of said nozzle bores diverging from said nozzle inlet to said nozzle outlet at a half angle of less than 7° which decreases the velocity of said air from said nozzle inlet to said nozzle exit to a level which will not substantially damage the catalyst.

8. The structure set forth in claim 7, wherein,
- (a) a second cylindrical housing means is mounted on top of said first cylindrical housing means, both said cylindrical housing means having nozzles mounted therein.

9. The structure set forth in claim 7, wherein,
- (a) said bore of said nozzle is flared outwardly from said nozzle inlet to said nozzle outlet at a half angle of substantially 3.5°.

10. An air distribution apparatus as recited in claim 7 wherein,
- (a) second cylindrical hollow housing means being mounted on said first cylindrical hollow housing means, and
- (b) nozzles mounted in said second cylindrical housing means for delivering gas internally of said header ring for even distribution of high velocity gas to the catalyst.

11. An improved air distribution apparatus for delivering an oxygen-carrying gas such as air at high pressure to a zone of spent catalyst in a regenerator of a fluid catalytic cracking process with maximum desired pressure differential and at a velocity below a level which would damage the catalyst, comprising,
- (a) a header support assembly adapted for mounting in a regenerator of a fluid catalytic cracking process, said header support assembly supporting a hollow header ring having a plurality of openings therein,
- (b) an air supply line attached to said header support assembly and air supply means for supplying air through said air supply line to said hollow header ring at a pressure which causes a maximum effective pressure differential between said ring and in said regenerator,
- (c) a plurality of nozzles and mount means mounting said nozzles in said openings in said header ring, each of said nozzles having a bore therethrough which forms a nozzle inlet which initially receives air from said header ring and a nozzle exit for directing air outwardly into such spent catalyst zone,
- (d) each of said nozzle bores diverging from said nozzle inlet to said nozzle outlet at a half angle of 1° which decreases the velocity of said air from said nozzle inlet to said nozzle exit to a level which will not substantially damage the catalyst,
- (e) a first cylindrical hollow housing section having radial pipe members mounted therein and extending outwardly to support said header ring,
- (f) a second cylindrical hollow housing section positioned on said first housing section,
- (g) said first and second housing sections having openings therein,
- (h) a plurality of nozzles mounted in said openings in said first and second housing sections, each nozzle having a bore therethrough diverging from a nozzle inlet to a nozzle exit, and
- (i) mount means mounting said nozzles in said housing at the nozzle inlets thereof.

* * * * *